United States Patent
Rodrigues et al.

(10) Patent No.: US 7,165,188 B1
(45) Date of Patent: *Jan. 16, 2007

(54) SYSTEM AND METHOD FOR MANAGING LONG-RUNNING PROCESS CARRIED OUT UPON A PLURALITY OF DISKS

(75) Inventors: Steven H. Rodrigues, Mountain View, CA (US); Rajesh Sundaram, Mountain View, CA (US)

(73) Assignee: Network Appliance, Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/047,082

(22) Filed: Jan. 31, 2005

Related U.S. Application Data

(63) Continuation of application No. 09/928,389, filed on Aug. 13, 2001, now Pat. No. 6,851,070.

(51) Int. Cl.
*G06F 11/00* (2006.01)
*G06F 13/00* (2006.01)
*G06F 9/46* (2006.01)

(52) U.S. Cl. .......................... 714/5; 711/114; 711/160; 718/103

(58) Field of Classification Search ................ 711/114, 711/160, 167; 718/103; 710/23; 714/5
See application file for complete search history.

(56) References Cited

U.S. PATENT DOCUMENTS

| | | | | |
|---|---|---|---|---|
| 5,495,491 A * | 2/1996 | Snowden et al. | ........... | 714/764 |
| 5,632,012 A * | 5/1997 | Belsan et al. | ................... | 714/6 |
| 5,664,187 A * | 9/1997 | Burkes et al. | .............. | 707/205 |
| 5,829,023 A * | 10/1998 | Bishop | ........................ | 711/118 |
| 5,978,952 A * | 11/1999 | Hayek et al. | ................ | 714/764 |
| 5,987,628 A * | 11/1999 | Von Bokern et al. | ......... | 714/48 |
| 6,477,546 B1 * | 11/2002 | Velamuri et al. | ........... | 707/202 |
| 6,480,982 B1 * | 11/2002 | Chan et al. | ................. | 714/764 |
| 6,487,638 B1 * | 11/2002 | Dawkins et al. | ............ | 711/133 |
| 6,594,786 B1 * | 7/2003 | Connelly et al. | ............. | 714/50 |
| 6,611,852 B1 * | 8/2003 | Morley et al. | .............. | 707/206 |
| 6,633,299 B1 * | 10/2003 | Sreenivas et al. | ........... | 345/557 |
| 6,633,954 B1 * | 10/2003 | Don et al. | ................... | 711/114 |
| 6,760,723 B1 * | 7/2004 | Oshinsky et al. | .............. | 707/3 |
| 7,012,835 B1 * | 3/2006 | Gonzalez et al. | ...... | 365/185.11 |
| 2001/0047497 A1 * | 11/2001 | Larson et al. | ................. | 714/42 |
| 2002/0056025 A1 * | 5/2002 | Qiu et al. | ................... | 711/133 |
| 2002/0152105 A1 * | 10/2002 | Dan et al. | ...................... | 705/8 |
| 2002/0162075 A1 * | 10/2002 | Talagala et al. | ............ | 714/819 |

* cited by examiner

*Primary Examiner*—Robert Beausoliel
*Assistant Examiner*—Christopher McCarthy
(74) *Attorney, Agent, or Firm*—Cesari & McKenna, LLP; Shannen C. Delaney

(57) ABSTRACT

A method for managing a long-running process carried out upon a plurality of disks is disclosed. A registry is established, the registry having a plurality of entries, each entry corresponding to one of the plurality of disks, each entry having a value indicative of a respective time at which its corresponding disk was last acted-upon by the long-running process. The long-running process executes on each of the disks based upon an order in which the disk having an oldest last acted-upon time is processed first and the disk having the newest last acted-upon time is processed last.

73 Claims, 5 Drawing Sheets

SYSTEM AND METHOD FOR MANAGING LONG-RUNNING PROCESS CARRIED OUT UPON A PLURALITY OF DISKS

This U.S. patent is a continuation of U.S. patent application Ser. No. 09/928,389 filed on Aug. 13, 2001, now issued as U.S. Pat. No. 6,851,070 B1 on Feb. 1, 2005.

FIELD OF THE INVENTION

This invention relates to networked data storage systems, and more particularly to long-running disk array maintenance operations, such as disk scrubbing, operating within such storage systems.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a storage system that implements file system semantics and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly) data/parity partitions in a single disk) arranged according to a RAID 4, or equivalent high-reliability, implementation.

In the operation of a disk array, it is fairly common that a disk will fail. A goal of a high performance storage system is to make the mean time to data loss (MTTDL) as long as possible, preferably much longer than the expected service life of the storage system. Data can be lost when one or more storage devices fail, making it impossible to recover data from the device. Typical schemes to avoid loss of data include mirroring, backup and parity protection. Mirroring is an expensive solution in terms of consumption of storage resources, such as hard disk drives. Backup does not protect recently modified data. Parity schemes are common because they provide a redundant encoding of the data that allows for, typically, a single erasure (loss of one disk) with the addition of just one disk drive to the system.

Specifically, the redundant information provided by parity protection is computed as the exclusive-OR (XOR), i.e., the sum over one-bit fields, of the data on all disks. As referenced above, the disks are typically divided into parity groups, each of which comprises one or more data disks and a parity disk. The disk space is divided into stripes, with each stripe containing one block from each disk. Typically, the blocks of a stripe are at the same location on each disk in the parity group. Within a stripe, all but one block are data blocks and one block is a parity block, computed by the XOR of all the data.

If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. If one disk fails in the parity group, the contents of that disk can be reconstructed on a second "spare" disk or disks by adding all the contents of the remaining data blocks and subtracting the result from the parity block. Since two's complement addition and subtraction over one-bit fields are both equivalent to XOR operations, this reconstruction consists of the XOR of all the surviving data and parity blocks. Similarly, if the parity disk is lost, it can be recomputed in the same way from the surviving data.

Far more likely than a second disk drive failing in a RAID group (before reconstruction has been completed for a previous disk failure) is the possibility that there may be an unknown bad block (media error) on an otherwise intact disk. If the RAID group has no failed disks, the filer can compensate for bad blocks by using parity information to recompute the bad block's original contents, which is then remapped to a "spare" block elsewhere on the disk. However, if a bad block is encountered while the RAID group is in degraded mode (after a disk failure but before reconstruction has completed), then that block's data is irrecoverably lost. To protect against this scenario, filers routinely verify all data stored in the file system using RAID "scrubbing." The scrubbing operation may be scheduled to occur at regular intervals (for example, once per week, early on Sunday morning). However, automatic scrubbing is optional and can be suppressed. During this process, all data blocks are read from RAID groups, which have no failed drives. There are a number (N) of non-degraded RAID groups that are scrubbed simultaneously using a series of N working threads. Note that N is typically a predefined number that is configuration-dependent, and often based upon the processing resources available—it is usually less than the total number of RAID groups being scrubbed, causing the scrubbing of a number of RAID groups to be delayed until completion of previous groups by the threads. If the XOR computation of data parity with stored parity is erroneous, then an assumption is typically made that the data parity is correct and the stored parity is corrupted. Accordingly, the new "correct" parity is recomputed, and written to a spare parity block.

Current storage system implementations may connect hundreds of RAID groups into arrays of more than a terabyte of storage space. Where automatic, scheduled scrubbing (and/or other long-running maintenance functions/processes including defragmentation and surface scan) are applied to such large arrays of disks, they may run the process in excess of an allotted time—be it one evening, one day, or perhaps one weekend. This is true of even the fastest-processing, and most-capable, storage systems. It is common for scrubbing and other long-running processes to impose a significant performance penalty on other ongoing user processes that may be tolerable on a non-work day or at off-peak use times. However, at the start of a workday, when the load imposed by scrubbing on system resources may interfere with disk service (and not be tolerable), it is common to interrupt the scrubbing (or other long-running) process before full completion. As such, a given number of RAID groups or volumes may remain unprocessed.

When the long-running process is again begun (on a following evening or weekend), the process may simply begin work upon the same disks checked the last time. This is because the disks may be presented in the overall array a certain order, based upon their serial numbers or volume identifiers, that seldom change—and the process may be keyed to work in the basic order of existing disk/volume identifiers, regardless of when they were last checked. Clearly, continuous interruptions of the process before it naturally completes will deny certain trailing disks/volumes in the order from being regularly checked. The reliability of these trailing disks/volumes will then become further and further uncertain, and errors in these unchecked/seldom-checked disks will mount.

It is, therefore, an object of this invention to provide a system and method for enabling the time of long-running disk array maintenance processes to be limited, and therefore cause certain disks/volumes to be unprocessed, without systematically reducing the regularity and frequency in which all disks in the array are checked. This system and method should allow time-limited, long-running processes to be applied to both older disks and newly added disks each time the process is initiated with fairness to all disks. In other words, all disks in the array should experience approximately the same time between checks regardless of where they fall within the array's predetermined order.

SUMMARY OF THE INVENTION

This invention overcomes the disadvantages of the prior art by providing a system and method for managing a time-limited long-running process that acts upon disks of a disk array based upon a general rule of acting upon each disk in an order based upon the length of time from when it was last acted-upon. Disks having the greatest last acted-upon time value (e.g. were processed the longest-time ago) are queued first by the process for acting-upon in the present run. The greatest last acted-upon time includes disks that have no prior last acted-upon time (e.g. newly added/mounted disks).

According to an illustrative embodiment, a registry key entry is maintained in a registry file that is recognized by the file system. Each registry key entry includes the volume's file system identifier (FSID) and particular RAID group identifier (RGID). These values are also present in a metadata disk label for each disk in the array. Associated with the RGID of the key entry is also the last acted-upon time for the RAID group. This is set to a positive time number if the process has last acted-upon the group to completion. Alternatively, the last acted-upon time value is set to zero if the RAID group is newly present in the array. Where a prior, uncompleted process has occurred on a volume, the recorded "last stripe" number, indicating the last stripe location upon which the process acted in the uncompleted group. The process, when again initiated, sorts all registry entries in numeric order, going from zero-value entries (newly added/not previously processed), and proceeding the smallest last acted-upon values (longest-ago processed) through the greatest last acted-upon values (most-recently processed). A series of working threads in the filer's operating system are established to process RAID groups of the array "simultaneously" in parallel, starting with the zero entries (in order presented) and continuing through the remaining sorted entries in the sort order. Each time a RAID group is completely processed, the group's registry key entry is updated to reflect the most-recent last acted-upon time. This group will then become the last to be processed if an interruption occurs immediately thereafter. If processing of any group is interrupted prior to completion, its last acted-upon time value remains unchanged (representing an older time than the present process), and has a non-zero last stripe number appended to it, representing the last stripe completed by the process.

According to an illustrative embodiment, the system and method of this invention can be applied in RAID scrubbing processes. Other long-running processes such as virus-scanning, defragmentation and the like may also operate in accordance with the system and method of this invention. The last acted-upon value may be a timestamp, based upon a "get time" function within the filer operating system that returns absolute elapsed time (in milliseconds, for example) since an absolute base time (e.g. 12:00 GMT on Jan. 1, 1970).

A timer function derived from the internal operating system timer limits the running time of the process. The timer function is adapted to cease if the process fully completes before a user-defined time limit (six hours, for example) elapses. The timer may be overridden by the user or if the process is initiated by the user.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
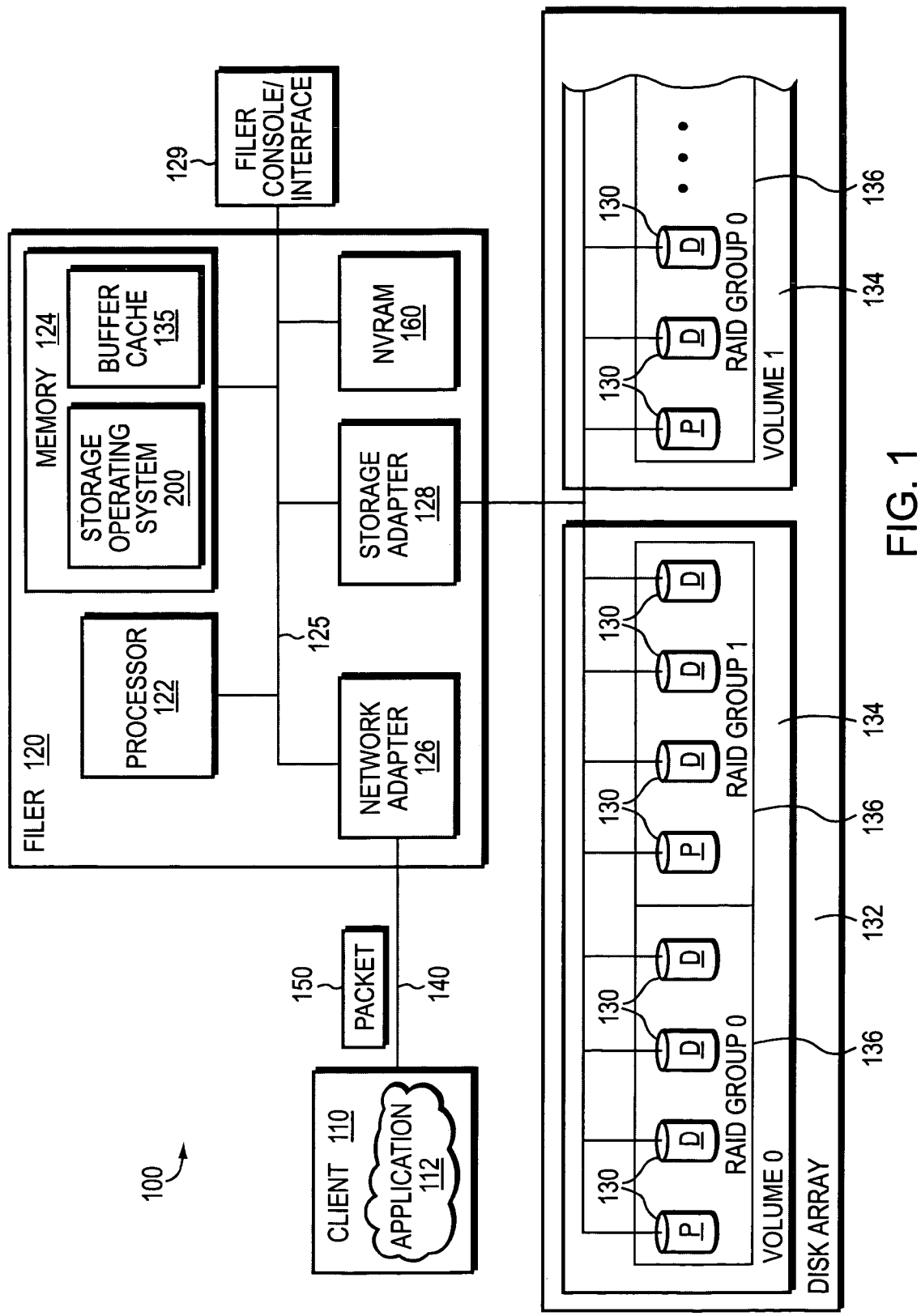
FIG. 1 is a schematic block diagram of a network environment including a file server and disk array that may be advantageously used with the present invention.

FIG. 1 is a schematic block diagram of an environment 100 that includes a client 110 having one or more applications 112, and interconnected file server 120 that may be advantageously used with the present invention. The file server or "filer" 120 is a special-purpose computer that provides file service relating to the organization of information on storage devices, such as disks 130. It will be understood to those skilled in the art that the inventive technique described herein may apply to any type of special-purpose (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Notably, the Filer 120 includes an NVRAM 160 that provides fault-tolerant backup of data, enabling the integrity of filer transactions to survive a service interruption based upon a power failure, or other fault. The size of the NVRAM is variable. It is typically sized sufficiently to log a certain time-based chunk of transactions (for example, several seconds worth). The NVRAM is filled, in parallel with the buffer cache, after each client request is completed, but before the result of the request is returned to the requesting client.

In a preferred embodiment, the disk array 132 is arranged as a plurality of separate volumes (Volume 0, Volume 1, etc.), each having a file system associated therewith, as described further. The volumes each include one or more RAID groups 136 of disks 130 denoted generally RAID Group 0, RAID Group 1, etc. In a typical implementation, the RAID groups 136 each include independent physical disks 130 including those storing striped data (D) and those storing separate parity (P) for the data, in accordance with the preferred embodiment that employs a RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group and a multiplicity of RAID groups per volume, as shown.

To facilitate access to the disks 130 on the array 132, the operating system 200 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is preferably the NetApp® Data ONTAP™ operating system available from Network Appliance, Inc., Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The organization of the preferred storage operating system for the exemplary filer is now described briefly. However, it is expressly contemplated that the principles of this invention can be implemented using a variety of alternate storage operating system architectures.

Figure 2:
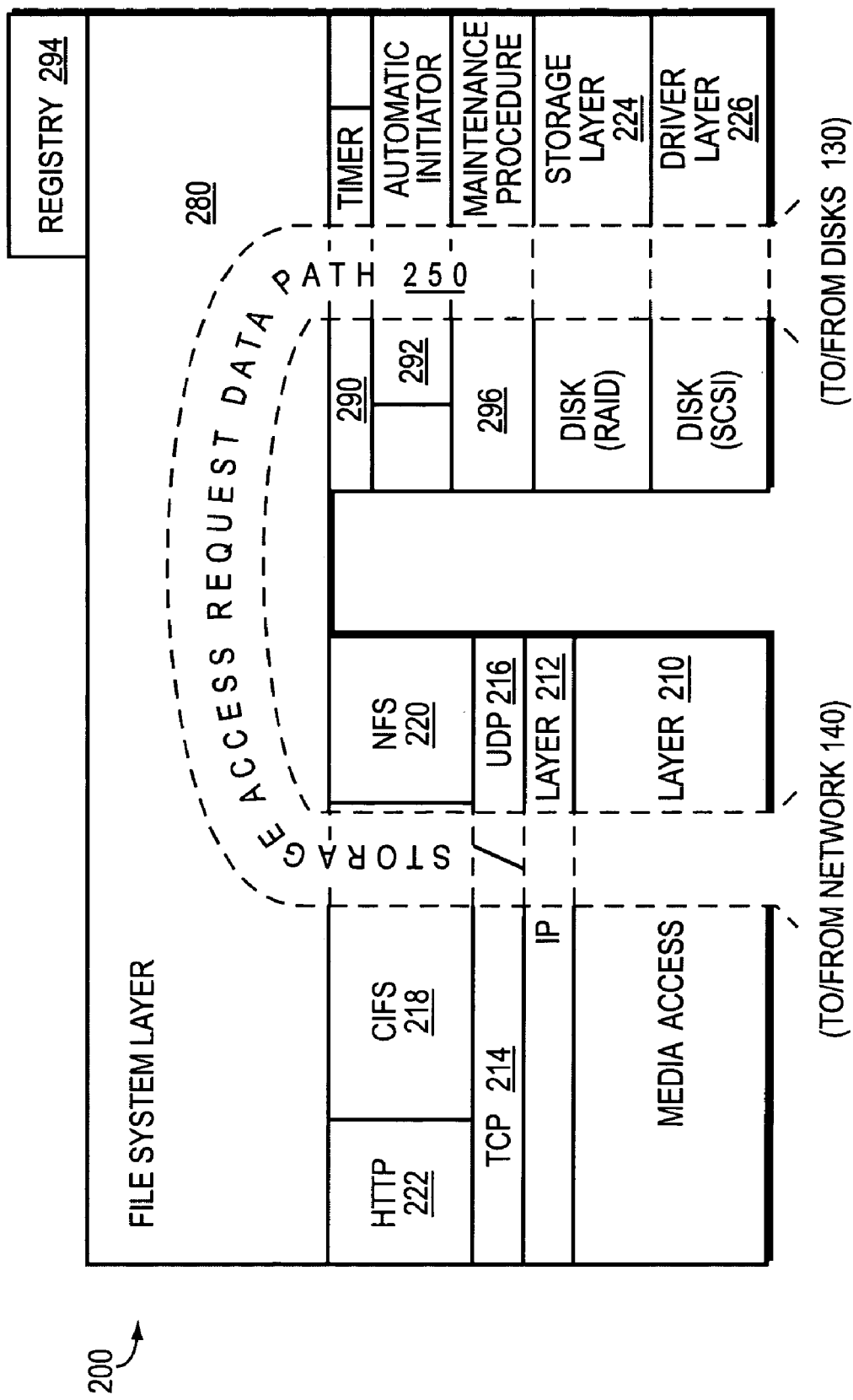
FIG. 2 is a schematic block diagram of an operating system file system layer that may be advantageously used in connection with the file server of FIG. 1.

As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation can, for some applications, the performance of the file service provided by filer 120 in response to a file system request packet 150 issued by client 110.

Notably, the Filer 120 includes an NVRAM 160 that provides fault-tolerant backup of data, enabling the integrity of filer transactions to survive a service interruption based upon a power failure, or other fault. The size of the NVRAM is variable. It is typically sized sufficiently to log a certain time-based chunk of transactions (for example, several seconds worth). The NVRAM is filled, in parallel with the buffer cache, after each client request is completed, but before the result of the request is returned to the requesting client.

It will be understood to those skilled in the art that the inventive technique described herein may apply to any type of special-purpose (e.g., server) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

The system and method for managing a time-limited long-running process performed on a set of disks will now be described in detail. For the purposes of this description, the exemplary long-running process is RAID scrubbing, in which data parity for each stripe is computed, and compared to data parity stored in disk, and erroneous data parity on disk is rewritten in view of (assumed) correct computed stripe data parity. However, the description of scrubbing is only an example of a variety of long-running processes (such as virus scanning, disk defragmentation, surface scanning, and the like) which can be carried out upon a group of disks, and the term "process," as applied to the disks, should be taken broadly to define any long-running process that may require timed cutoff. Additionally, the use of a RAID disk organization is exemplary, and another disk configuration can be substituted as appropriate.

According to a preferred embodiment, reference is made to a group of functional blocks/components within the operating system 200 that are employed to carry out the advantageous teachings of a preferred embodiment of this invention. Briefly, a timer mechanism 290 is provided. This mechanism derives time values from the system's basic timer, which typically provides an absolute time value from a fixed reference point. In one example, this absolute time value is the number of elapsed milliseconds from 12:00 am GMT on Jan. 1, 1970. However, any reference point and time interval can be employed. The timer mechanism can compare a given time to a later elapsed time therefrom to determine when a preset interval has elapsed—the interval being the desired time in which a maintenance procedure may occur. In one example, this interval is six hours (or 21,600,000 milliseconds) from the designated start time. An appropriate function call (which may be UNIX®-based) is employed to retrieve a time value from the time mechanism.

The storage operating system 200 also provides an automatic initiation process 292 that typically comprises a daemon within the operating system. In the exemplary Data ONTAP operating system, and a variety of other Unix®-based operating systems, this is usually termed the "cron" daemon.

Briefly, the storage operating system 200 also provides a RAID maintenance mechanism 296 that, in this embodiment, is a RAID scrub mechanism for executing a scrubbing procedure as described above. However, this mechanism can be any of a number of long-running processes to be carried out on the disk array or portions thereof according to a time schedule (or a plurality of different long-running processes).

In addition, the storage operating system supports a registry 294 that contains entries with respect to the inventory of last-known attached disks/volumes with respect to the particular filer 120. The registry, as described in detail below, contains information with respect to last acted-upon time for the subject long-running maintenance operation (if any). In one embodiment, the registry is stored in a specific file on the disk array at an appropriate location or locations with respect to the file system. It is accessed by the storage operating system, and loaded into filer memory when needed. It may comprise, for example, a text file in the filer's root volume having a series of keys that include the volume identifier and RAID group along with the needed state information with respect to the long running process. This structure is described in further detail below. However, the implementation of the registry is highly variable, as is its storage location. According to an alternate embodiment, it can reside in a non-volatile memory or other storage medium that is accessible when needed.

As also described below, not all volumes currently present in the system may match the inventory of volumes in the registry. Any differences therebetween are resolved in accordance with the general procedure of FIG. 4, which is discussed in further detail below.

Figure 3:
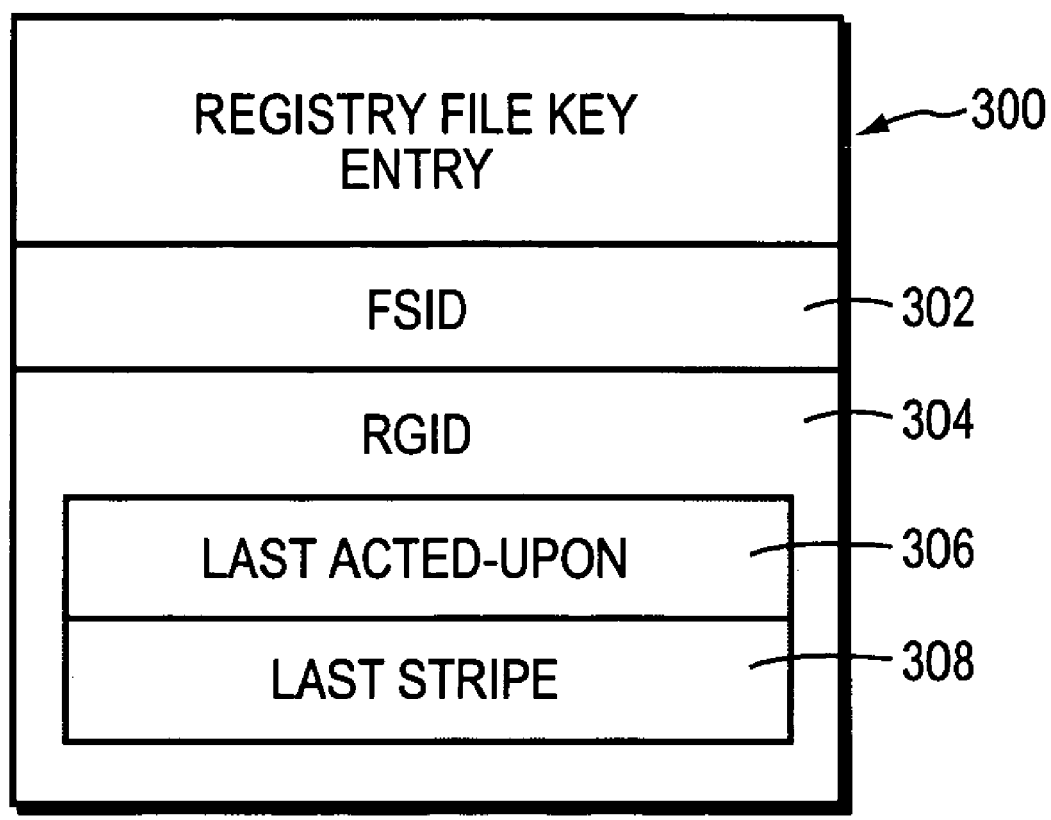
FIG. 3 is a schematic graphical representation of an exemplary registry key entry, containing the file system identifier (FSID), RAID group identifier (RGID) and the appropriate process last acted-upon and last stripe acted-upon information according to an embodiment of this invention.

First, reference is made to FIG. 3, which details a typical registry file entry 300 in accordance with an embodiment of this invention. The entry is part of the overall registry file, which is stored in the disk array at one or more locations that are recognized by the file system. The registry file is read from the appropriate disk(s) into the filer memory for file service operations. The information in the entry 300 includes the associated volume's file system identifier (FSID) 302 and RAID group identifier (RGID) 304. The FSID is a unique identifier for the volume. A given RAID group is uniquely identified by a tuple consisting of the FSID and an RGID.

Figure 4:
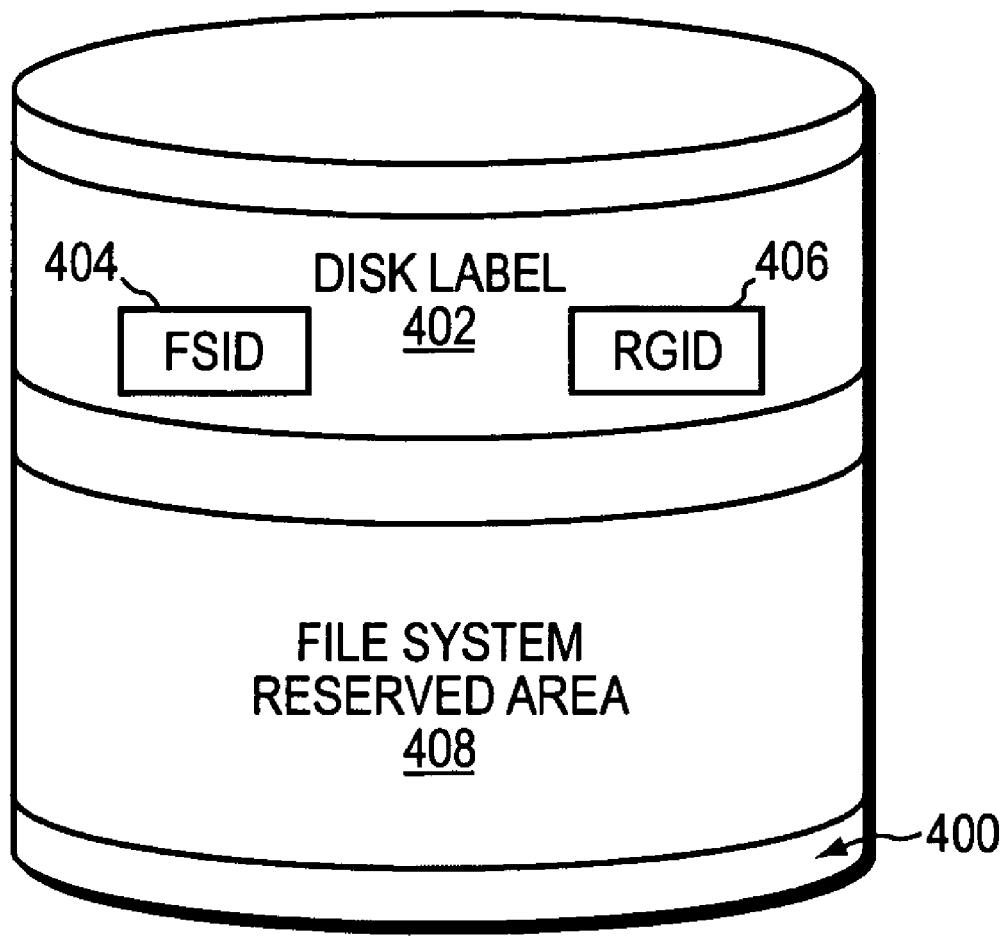
FIG. 4 is a schematic diagram of an exemplary disk including a disk label and associated FSID/RGID tuple according to an embodiment of this invention.

With reference to the exemplary disk 400 in FIG. 4, note that the unique FSID and RGID tuple (402 and 404, respectively) is also placed in each disk at an appropriate location known as a disk label 406. These labels are stored on-disk in a predetermined location, typically as meta-data outside the disk area 408 reserved for use by the file system. They are looked to when assimilation of disks occurs, whereby the disks are sorted into RAID groups and, whence, into volumes. Since RAID groups are not separated from their volumes, the particular RAID group is never confused with any other, based upon its tuple. As such the system can reliably refer to any RAID group, at any time, by the tuple.

Referring again to FIG. 3, the information stored in the registry key entry includes values for the time last acted-upon 306 (e.g. the time in which a scrub or other subject operation was performed on the RAID group), and the last stripe 308 in the particular RAID group to be last acted-upon (e.g. last stripe scrubbed). As noted, this information can be stored as a key in the registry having an appropriate name prefix such as state.raid.scrub, so as to identify the appropriate data structures relating to scrub operations on RAID groups (or other long-running operations).

Figure 5:
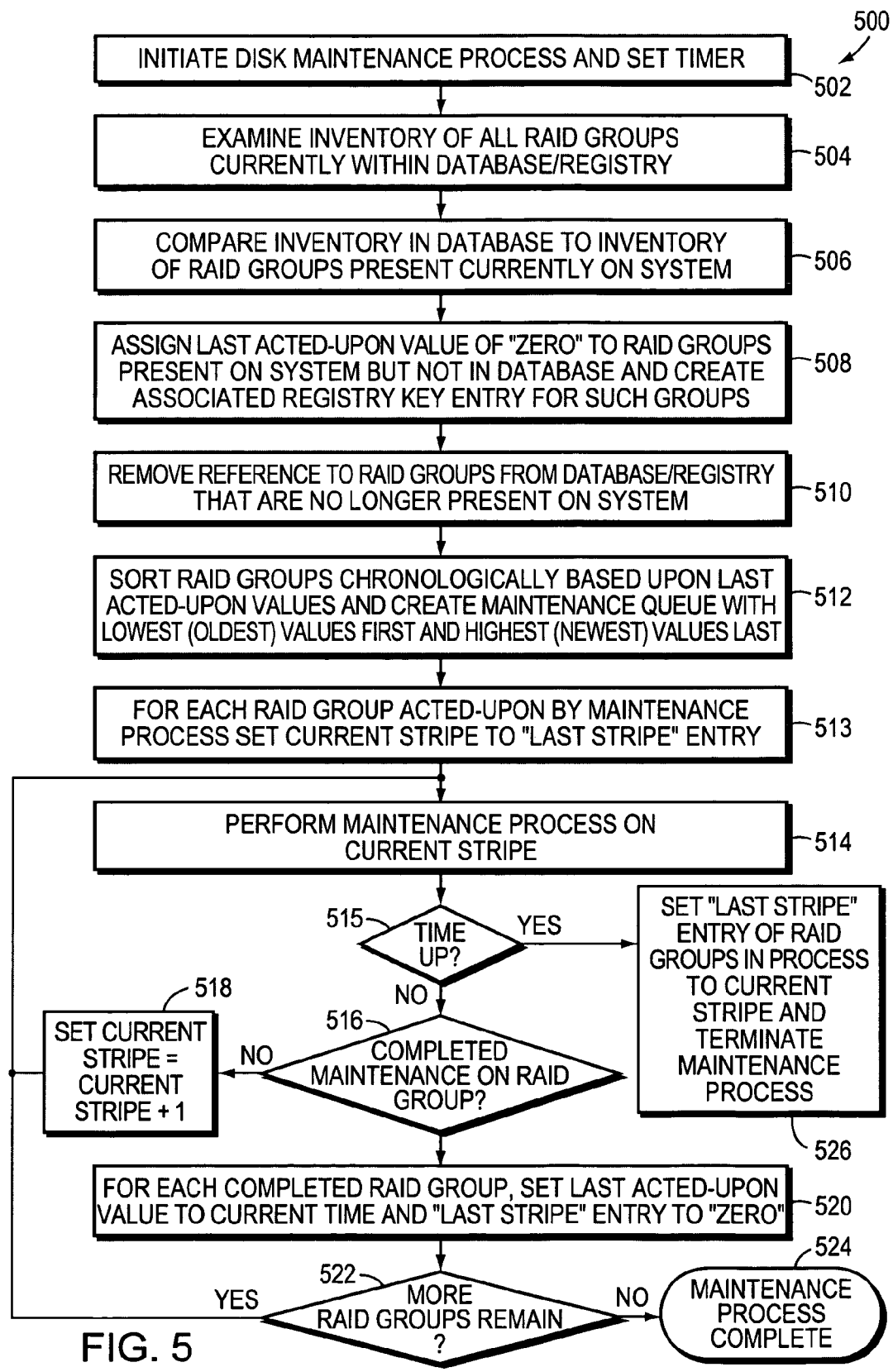
FIG. 5 is flow diagram of a procedure for performing a time-limited long-running maintenance process upon a group of disks according to an embodiment of this invention.

Reference is now made to FIG. 5, which details a procedure 500 for performing a long-running maintenance (or other) process under a time constraint in accordance with an embodiment of this invention. First, the automatic initiator, instructs the long-running maintenance procedure (scrubbing in this example) to begin, and sets the timer using an appropriate function call (step 502). The completion time for the maintenance procedure is computed as part of the timer setting process. A default time can be used, such as six hours. Alternatively, a different automatic completion time can be input by the operator through the interface. An appropriate function call is provided to set the time.

In one embodiment, if a maintenance process is requested by the operator out of the normal automatic schedule (which does not typically involve the automatic initiator), then no time limit is set—as it is assumed that the operator wishes the maintenance procedure to run to completion. However, it is contemplated that the operator can set a time limit manually (or by default) when using manual initiation of the maintenance process. If so, then teachings of this invention may apply. In addition, the teachings of this invention may apply when an operator manually intervenes to terminate the ongoing maintenance process through any form of interrupt command or action.

The inventory of RAID groups resident in the registry/database is then examined by the procedure 500 in accordance with step 504. This entails a "registry walk" in which all keys with the desired maintenance function prefix (described above) are located. The RAID groups currently present within the storage array are accessed from disk, and the FSID/RGID tuples in the disk labels are loaded into memory for comparison with the FSID/RGID entries of current registry keys in accordance with step 506. Part of the registry-versus-FSID/RGID disk label comparison also involves reading of the current last acted-upon values for each group, as well as the last-stripe (acted-upon) values in the registry as appropriate.

Based upon the results of the comparison of step 506, any RAID groups that have not yet appeared in the registry (no FSID, RGID key present), are now placed in the registry with their read FSID, RGID values from the disk label forming a key. At this time the last acted-upon value is set to zero (or another predetermined value indicative of a newly added group). In addition the last stripe value is set to zero (or an equivalent beginning value for a stripe in the group) indicating that no last stripe has been acted-upon within the RAID group (step 508).

Similarly, if the comparison of step 506 establishes the absence of a particular FSID, RGID tuple in the disk labels relative to a key entry in the registry, then this indicates that a given RAID group is no longer present. As such, the reference to that RAID group in the registry is removed (step 510).

Having established the active RAID groups and provided each group with its own appropriate registry key entry, the procedure 500 then sorts the groups according to their last acted-upon values (step 512). A variety of well-known sorting routines can be employed to sort the registry entries. For example, a "quick-sort" algorithm can be employed. The result of the sorting process is a maintenance (scrub) queue according to RAID group, starting with the lowest (oldest) last acted-upon values (zero values, if any) at the top of the queue, and proceeding through the highest (newest) last acted-upon values at the bottom.

Once the maintenance queue is established, the maintenance procedure proceeds in accordance with step 513. Each last stripe entry value is noted and assigned the current stripe value. That last stripe value is zero for newly added RAID groups or RAID groups that were completely processed in the last run. That value is a positive value where the process was interrupted in the last run upon the respective group, and the positive value equals the last stripe to be processed/worked-on. The performance of the maintenance process thus proceeds generally in accordance with step 514 for each working thread of the process. Specifically, the maintenance process may establish a multiplicity of working threads. Each thread takes a given "top" entry from the queue and begins processing the underlying RAID group denoted by the entry. Note that each "top" entry is incremented, as one of the threads take up its particular top entry so that no two queues are presented with the same top entry. As the RAID group of each entry is processed to completion, the thread moves on to the group associated with the next top entry in the queue. Each thread moves at its own pace, taking a new top entry from the queue as it is ready. Set as the current "zero" value, each thread starts working on the "last stripe" previously processed in accordance with the last stripe value in the entry. This is either a zero value (where a RAID group was newly added or previously processed to completion) or a positive value (where the processing was previously interrupted between stripes before full completion). Where the last stripe is zero, the maintenance process begins working on the first stripe in the group. Each key with a zero last acted-upon value is presented at the top of the queue. There may be no set order for zero-value entries according to one embodiment. However, the order of zero entries can be further queued using a variety of criteria including the existence of positive last stripe values (queued first) and/or the underlying values of the FSID, RGID, or both.

The process on a given group continues, with the procedure 500 awaiting a timeout. If no timeout is yet reached (decision step 515) and the maintenance on the RAID group is not yet complete (decision step 516), then the current stripe value is incremented by one (step 518). The process then begins work on the next stripe within the given RAID group (branching to step 514), and steps 515, 516 and 518 repeat until the RAID group is completely processed.

As the maintenance process for each RAID group is completed, the procedure 500 branches to step 520, in which the last acted-upon value in the group's associated registry key entry is set to the present timestamp (as retrieved from the system timer), and the last stripe entry is set to zero. This will now be the "freshest" group to be processed—and, consequently, the last group to be reprocessed the next time the procedure runs (specifically, if timeout occurs at that moment).

The procedure 500, after resetting a given RAID group's last acted-upon and last stripe entry (in accordance with step 512), then determines whether any other RAID group entries remain in the queue (decision step 522). If and when all RAID groups in a queue are completed, then the procedure ends naturally (step 524, via decision step 522), awaiting the next scheduled run. However, if one or more groups remain to be processed, the procedure 500 branches from decision step 522 back to step 514, to beginning processing of the current stripe of the next group by the next available working thread.

Conversely, when the time limit is reached (or a manual interrupt is applied), the decision step 515 branches to step 526. At this time each working thread ceases the maintenance process upon its respective RAID group. If completion on a given group is relatively near, it is contemplated, according to an alternate embodiment, that a sub-procedure may exist to enable that group to complete naturally (for example, if only a small number of stripes remain to be processed). In other words a graceful termination is permitted. However, according to a preferred embodiment, the procedure ends at the current stripe being processed. If so, the value of the stripe is noted as the last stripe entry, and the registry key for that RAID group is updated with the current last stripe value. However, the last acted-upon value for that group is not updated, and remains set at the previous last acted-upon value. In this manner, the incomplete group is more likely to be taken up for processing to completion early in the next run of the maintenance procedure.

When the registry key entries are rewritten to disk at the appropriate registry file locations, they are updated with the new last acted-upon values and last stripe values as appropriate. This establishes a new benchmark for the maintenance registry upon which the next maintenance operation can occur.

The foregoing has been a detailed description of illustrative embodiments of the invention. Various modifications and additions can be made without departing from the spirit and scope of this invention. For example, the layout of various file system and storage operating system components is variable. Timers, maintenance procedures and other functions can reside in and interact with differing system components than those shown. In addition, while the procedure for updating key entries is based upon an automated maintenance procedure, the term "time limit" or "timeout" is expressly meant to include a manually-applied interrupt to an automatically or manually scheduled and initiated maintenance procedure. Further, the term "RAID group" or "group" should be taken broadly to include other logical organizations of large arrays of disks. In addition, the term "maintenance" procedure should be taken broadly to include any long-running process involving the disk array for which a time limit may be desirable. Also, while last acted-upon time values are updated on a RAID group-by-RAID group completion basis, they may alternatively be updated on a volume-by-volume or other organizational block basis as appropriate for the particular configuration of the disk array. Finally, it is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example, and not to otherwise limit the scope of this invention.

What is claimed is:

1. A method for managing a long-running process carried out upon a plurality of disks, the method comprising the steps of:
    establishing a registry having a plurality of entries, each entry corresponding to one of the plurality of disks, each entry storing a value of a last acted-upon time indicative of a respective time at which the entries' corresponding disk was last acted-upon by the long-running process;
    sorting the plurality of entries into an order based upon a comparison of the last acted-upon time of each entry with the last acted-upon time of one or more other entries;
    performing the long-running process on each of the disks based upon the order, in which the disk having an oldest last acted-upon time is processed first and the disk having a newest last acted-upon time is processed last;
    ceasing the long-running process; and
    restarting the long-running process on each of the disks so that the disk with the oldest last acted-upon time remaining after ceasing the long-running process is processed first.

2. The method of claim 1, further comprising:
    updating a value of the last acted-upon time for each of the disk as each of the disks is respectively completely processed by the long running process.

3. The method of claim 1, further comprising:
    ceasing the long-running process based upon a time limit from an initiation time of the long-running process.

4. The method of claim 1, further comprising:
    updating, in response to ceasing the long-running process, a value of the last acted-upon time so that the disks not completely processed by the long-running process retain a previous value for their respective last acted-upon time.

5. The method of claim 1, further comprising:
    arranging the plurality of disks into a plurality of groups of disks.

6. The method of claim 5, further comprising:
    providing, in response to establishing a registry entry, a value for a last position in each of the groups at which the long-running process was performed.

7. The method of claim 5, further comprising:
    providing, in response to ceasing the long running process, in each of the groups for which the long-running process was not completed, a last position value indicating the last disk processed by the long running process.

8. The method of claim 7, further comprising:
    arranging the groups of disks into a redundant array of independent disk (RAID) organization to produce RAID-organized disks.

9. The method of claim 8, further comprising:
    basing the last position value upon a predetermined data stripe within each of the respective groups of the RAID-organized disks.

10. The method of claim 8, further comprising:
    using as the long-running process a RAID scrubbing process.

11. The method of claim 8, further comprising:
    including in the registry entry a file system identifier and a RAID group identifier with respect to RAID groups within the file system.

12. The method of claim 5, further comprising:
    defining a plurality of working threads, each working thread performing the long-running process, each of the threads performing the process to one of the groups.

13. The method of claim 1, further comprising:
    locating the registry in a file that is read from at least one storage location on the plurality of disks.

14. The method of claim 1, further comprising:
    establishing a process queue, the process queue having an order in which the long-running process is to be performed on respective of the disks.

15. The method of claim 1, further comprising:
    adding at least one new disk to the plurality of disks; and
    setting a value of the last acted-upon time for the new disk, to the oldest last acted-upon time.

16. The method of claim 1, further comprising:
    adding a new group of disks to the plurality of disks; and
    setting a value of the last acted-upon time for the new group of disks, the value of the last acted-upon time for the new group of disks being set to a beginning time for further execution of the long running process.

17. A system to manage a long-running process carried out upon a plurality of disks, the system comprising:
    means for establishing a registry having a plurality of entries, each entry corresponding to one of the plurality of disks, each entry storing a value of a last acted-upon time indicative of a respective time at which the entries' corresponding disk was last acted-upon by the long-running process;
    means for sorting the plurality of entries into an order based upon a comparison of the last acted-upon time of each entry with the last acted-upon time of one or more other entries;
    means for performing the long-running process on each of the disks based upon the order, in which the disk having an oldest last acted-upon time is processed first and the disk having a newest last acted-upon time is processed last;
    means for ceasing the long-running process; and
    means for restarting the long-running process on each of the disks so that the disk with the oldest last acted-upon time remaining after ceasing the long-running process is processed first.

18. The system of claim 17, further comprising:
    means for updating a value of the last acted-upon time for each of the disk as each of the disks is respectively completely processed by the long running process.

19. The system of claim 17, further comprising:
    means for ceasing the long-running process based upon a time limit from an initiation time of the long-running process.

20. The system of claim 17, further comprising:
    means for updating, in response to ceasing the long-running process, a value of the last acted-upon time so that the disks not completely processed by the long-running process retain a previous value for their respective last acted-upon time.

21. The system of claim 17, further comprising:
    means for arranging the plurality of disks into a plurality of groups of disks.

22. The system of claim 21, further comprising:
    means for providing, in response to establishing a registry entry, a value for a last position in each of the groups at which the long-running process was performed.

23. The system of claim 21, further comprising:
    means for providing, in response to ceasing the long running process, in each of the groups for which the long-running process was not completed, a last position value indicating the last disk processed by the long running process.

24. The system of claim 21, further comprising:
means for arranging the groups of disks into a redundant array of independent disk (RAID) organization to form RAID-organized disks.

25. The system of claim 24, further comprising:
means for basing the last position value upon a predetermined data stripe within each of the respective groups of the RAID-organized disks.

26. The system of claim 24, further comprising:
means for using a RAID scrubbing process as the long-running process.

27. The system of claim 24, further comprising:
means for including in the registry entry a file system identifier and a RAID group identifier with respect to RAID groups within the file system.

28. The system of claim 21, further comprising:
means for defining a plurality of working threads, each working thread performing the long-running process, each of the threads performing the process to one of the groups.

29. The system of claim 17, further comprising:
means for locating the registry in a file that is read from at least one storage location on the plurality of disks.

30. The system of claim 17, further comprising:
means for establishing a process queue, the process queue having an order in which the long-running process is to be performed on respective of the disks.

31. The system of claim 17, further comprising:
means for adding at least one new disk to the plurality of disks; and
means for setting a value of the last acted-upon time for the new disk, to the oldest last acted-upon time.

32. The system of claim 17, further comprising:
means for adding a new group of disks to the plurality of disks; and
means for setting a value of the last acted-upon time for the new group of disks, the value of the last acted-upon time for the new group of disks being set to a beginning time for further execution of the long running process.

33. A system to manage a long-running process carried out upon a plurality of disks, the system comprising:
a processor;
the processor to establish a registry having a plurality of entries, each entry corresponding to one of the plurality of disks, each entry storing a value of a last acted-upon time indicative of a respective time at which the entries' corresponding disk was last acted-upon by the long-running process;
the processor to sort the plurality of entries into an order based upon a comparison of the last acted-upon time of each entry with the last acted-upon time of one or more other entries;
the processor to perform the long-running process on each of the disks based upon the order, in which the disk having an oldest last acted-upon time is processed first and the disk having newest last acted-upon time is processed last;
the processor to cease the long-running process; and
the processor to restart the long-running process on each of the disks so that the disk with the oldest last acted-upon time remaining after ceasing the long-running process is processed first.

34. The system as in claim 33, further comprising:
the processor to update a value of the last acted-upon time for each of the disk as each of the disks is respectively completely processed by the long running process.

35. The system of claim 33, further comprising:
the processor to stop the long-running process based upon a time limit from an initiation time of the long-running process.

36. The system of claim 33, further comprising:
the processor to update, in response to stopping the long-running process, a value of the last acted-upon time so that the disks not completely processed by the long-running process retain a previous value for their respective last acted-upon time.

37. The system of claim 33, further comprising:
means for arranging the plurality of disks into a plurality of groups of disks.

38. The system of claim 37, further comprising:
the processor to provide, in response to establishing a registry entry, a value for a last position in each of the groups at which the long-running process was performed.

39. The system of claim 37, further comprising:
the processor to provide, in response to ceasing the long running process, in each of the groups for which the long-running process was not completed, a last position value indicating the last disk processed by the long running process.

40. The system of claim 37, further comprising:
means for arranging the groups of disks into a redundant array of independent disk (RAID) organization to form RAID-organized disks.

41. The system of claim 40, further comprising:
the processor to base the last position value upon a predetermined data stripe within each of the respective groups of the RAID-organized disks.

42. The system of claim 40, further comprising:
the processor to use a RAID scrubbing process as the long-running process.

43. The system of claim 37, further comprising:
the processor to include in the registry entry a file system identifier and a RAID group identifier with respect to RAID groups within the file system.

44. The system of claim 37, further comprising:
the processor to execute a plurality of working threads, each working thread performing the long-running process, each of the threads performing the process to one of the groups.

45. The system of claim 33, further comprising:
the processor to write the registry in a file that on at least one storage location on the plurality of disks.

46. The system of claim 33, further comprising:
the processor to establish a process queue having an order in which the long-running process is to be performed on respective of the disks.

47. The system of claim 33, further comprising:
means for adding at least one new disk to the plurality of disks; and
the processor to set a value of the last acted-upon time for the new disk, to the oldest last acted-upon time.

48. A computer readable media, comprising:
said computer readable media containing instructions for execution on a processor for the practice of a method for managing a long-running process carried out upon a plurality of disks, the method having the steps of,
establishing a registry having a plurality of entries, each entry corresponding to one of the plurality of disks, each entry storing a value of a last acted-upon time indicative of a respective time at which the entries' corresponding disk was last acted-upon by the long-running process;

sorting the plurality of entries into an order based upon a comparison of the last acted-upon time of each entry with the last acted-upon time of one or more other entries;

establishing the long-running process on each of the disks based upon the order, in which the disk having an oldest last acted-upon time is processed first and the disk having a newest last acted-upon time is processed last;

ceasing the long-running process; and restarting the long-running process on each of the disks so that the disk with the oldest last acted-upon time remaining after ceasing the long-running process is processed first.

49. A method for managing a long-running process carried out upon a plurality of storage devices, the method comprising the steps of:

establishing a plurality of entries, each entry corresponding to one of the plurality of storage devices, each entry storing a last acted-upon time indicative of a time when the entry's corresponding storage device was last acted-upon by the long-running process;

performing the long-running process on each of the storage devices based upon an order in which a storage device having an older last acted-upon time is processed before a storage device having a newer last acted-upon time;

updating, in response to completing the long-running process on a particular storage device, the last-acted upon time corresponding to the particular storage device; and retaining, in response to ceasing the long-running process prior to completion on a particular storage device, a previous last-acted upon time corresponding to the particular storage device.

50. The method of claim 49, further comprising:

ceasing the long-running process based upon a time limit from an initiation time of the long-running process.

51. The method of claim 49 wherein the storage device is a disk.

52. The method of claim 51, further comprising:

arranging the plurality of disks into a redundant array of independent disk (RAID); and using as the long-running process a RAID scrubbing process.

53. A method for managing a long-running process carried out upon a plurality of storage devices, the method comprising the steps of:

establishing a plurality of entries, each entry corresponding to one of the plurality of storage devices, each entry storing a last acted-upon time indicative of a time when the entry's corresponding storage device was last acted-upon by the long-running process;

performing the long-running process on each of the storage devices based upon an order in which a storage device having an older last acted-upon time is processed before a storage device having a newer last acted-upon time;

ceasing the long-running process based upon a time limit from an initiation time of the long-running process.

54. A system to manage a long-running process carried out upon a plurality of storage devices, the system comprising:

a registry configured to store a plurality of entries, each entry corresponding to one of the plurality of storage devices, each entry storing a last acted-upon time indicative of a time when the entry's corresponding storage device was last acted-upon by the long-running process;

a processor configured to perform the long-running process on each of the storage devices based upon an order in which a storage device having an older last acted-upon time is processed before a storage device having a newer last acted-upon time, the processor further configured to update, in response to completion of the long-running process on a particular storage device, the last-acted upon time corresponding to the particular storage device and the processor configured to retain, in response to cessation of the long-running process prior to completion on a particular storage device, a previous last-acted upon time corresponding to the particular storage device.

55. The system of claim 54, wherein the processor is further configured to cease the long-running process based upon a time limit from an initiation time of the long-running process.

56. The system of claim 54 wherein the storage device is a disk.

57. The system of claim 56 wherein the plurality of disks are arranged into a redundant array of independent disk (RAID) and the long-running process is a RAID scrubbing process.

58. A system to manage a long-running process carried out upon a plurality of storage devices, the system comprising:

a registry configured to store a plurality of entries, each entry corresponding to one of the plurality of storage devices, each entry storing a last acted-upon time indicative of a time when the entry's corresponding storage device was last acted-upon by the long-running process; and a processor configured to perform the long-running process on each of the storage devices based upon an order in which a storage device having an older last acted-upon time is processed before a storage device having a newer last acted-upon time, the processor further configured to cease the long-running process based upon a time limit from an initiation time of the long-running process.

59. A system to manage a long-running process carried out upon a plurality of storage devices, the system comprising:

means for establishing a plurality of entries, each entry corresponding to one of the plurality of storage devices, each entry storing a last acted-upon time indicative of a time when the entry's corresponding storage device was last acted-upon by the long-running process;

means for performing the long-running process on each of the storage devices based upon an order in which a storage device having an older last acted-upon time is processed before a storage device having a newer last acted-upon time;

means for updating, in response to completing the long-running process on a particular storage device, the last-acted upon time corresponding to the particular storage device; and means for retaining, in response to ceasing the long-running process prior to completion on a particular storage device, a previous last-acted upon time corresponding to the particular storage device.

60. A computer readable medium comprising executable program instructions for managing a long-running process carried out upon a plurality of storage devices, the executable program instructions for:

establishing a plurality of entries, each entry corresponding to one of the plurality of storage devices, each entry storing a last acted-upon time indicative of a time when the entry's corresponding storage device was last acted-upon by the long-running process;

performing the long-running process on each of the storage devices based upon an order in which a storage device having an older last acted-upon time is processed before a storage device having a newer last acted-upon time;

updating, in response to completing the long-running process on a particular storage device, the last-acted upon time corresponding to the particular storage device; and retaining, in response to ceasing the long-running process prior to completion on a particular storage device, a previous last-acted upon time corresponding to the particular storage device.

61. A computer readable medium comprising executable program instructions for managing a long-running process carried out upon a plurality of storage devices, the executable program instructions for:

establishing a plurality of entries, each entry corresponding to one of the plurality of storage devices, each entry storing a last acted-upon time indicative of a time when the entry's corresponding storage device was last acted-upon by the long-running process;

performing the long-running process on each of the storage devices based upon an order in which a storage device having an older last acted-upon time is processed before a storage device having a newer last acted-upon time;

ceasing the long-running process based upon a time limit from an initiation time of the long-running process.

62. A method for managing a long-running process carried out upon a plurality of disks, comprising:

halting the long-running process;

recording a time at which the long-running process is halted;

recording a last acted-upon segment of the plurality of disks acted upon by the long-running process; and restarting the long-running process, the long running process beginning at a next segment after the last acted-upon segment, the next segment having an oldest last acted-upon time.

63. The method of claim 62, wherein the long-running process is a disk scrubbing process.

64. The method of claim 62, wherein the long-running process is a virus scanning process.

65. The method of claim 62, wherein the long-running process is a disk defragmentation process.

66. The method of claim 62, further comprising:

recording a "last stripe" number indicating a last stripe location upon which the long-running process acted prior to halting.

67. The method of claim 62, further comprising:

halting at a first specified time.

68. The method of claim 62, further comprising:

restarting at a second specified time.

69. The method of claim 62, further comprising:

restarting after a failure.

70. A system for managing a long-running process carried out upon a plurality of disks, comprising:

a processor to halt the long-running process and to record a time at which the long-running process is halted;

the processor to record a last acted-upon segment of the plurality of disks acted upon by the long-running process; and the processor to restart the long-running process, the long running process beginning at a next segment after the last acted-upon segment, the next segment having an oldest last acted-upon time.

71. The system of claim 70, wherein the long-running process is a disk scrubbing process.

72. The system of claim 70, wherein the long-running process is a virus scanning process.

73. The system of claim 70, wherein the long-running process is a disk defragmentation process.

* * * * *